United States Patent [19]

Schneider et al.

[11] 3,913,143

[45] Oct. 14, 1975

[54] MAGNETIC HEAD FACE ASSEMBLY USING CHEMICALLY MACHINABLE GLASS CERAMIC BONDING MEANS

[75] Inventors: Robert A. Schneider, Del Mar, Calif.; Willem L. Kroon, Putten, Netherlands

[73] Assignee: Spin Physics, Inc., San Diego, Calif.

[22] Filed: Jan. 10, 1974

[21] Appl. No.: 433,039

[52] U.S. Cl. .................... 360/127; 29/603; 360/121
[51] Int. Cl.$^{2}$.... G11B 5/14; G11B 5/27; G11B 5/42
[58] Field of Search ........... 360/119, 121, 122, 127, 360/120; 65/43; 29/603

[56] References Cited

UNITED STATES PATENTS 3,760,494 9/1973 Lang .................................. 360/127
3,770,403 11/1973 Maries et al. ........................... 65/43

OTHER PUBLICATIONS

Haertlein, "Multielement Magnetic Head," IBM Tech. Disc. Bull., Vol. 13, No. 8, Jan. 1971, pg. 2333.

*Primary Examiner*—Bernard Konick
*Assistant Examiner*—R. S. Tupper
*Attorney, Agent, or Firm*—R. F. Cody

[57] ABSTRACT

Precision-lapped pieces of ceramic and ferrite are stacked together with pieces of ceramic-convertible glass. Firing of the stack causes the glass to devitrify and results in a comb-less track array assembly having precise track and track-to-track dimensions. The assembly is then processed to form part of a magnetic record and/or reproduce head.

2 Claims, 9 Drawing Figures

MAGNETIC HEAD FACE ASSEMBLY USING CHEMICALLY MACHINABLE GLASS CERAMIC BONDING MEANS

BACKGROUND OF THE INVENTION

1. Field of the Invention

The present invention relates in general to magnetic recording and reproduce heads, and more particularly to face assemblies therefor, and to methods of manufacturing such face assemblies. Although not so restricted, the invention has particular relevance to multi-track heads and to their methods of manufacture.

2. Description Relative to the Prior Art

Reference is had to U.S. Pat. Nos. 3,224,073 and 3,761,641 as representative of the art over which the invention is an improvement: As disclosed in each of such patents, two sets of slots are sliced into a relatively elongated ceramic block, the first set of slots being fitted with ferrite pieces which are bonded in place. The block and ferrite assembly (which hereafter shall sometimes be referred to as the basic track array assembly) is then halved longitudinally and, after a gapping substance is deposited on the ends of the exposed ferrite pieces, the two block halves are bonded back together. Then the second set of slots is fitted with ferrite shield pieces which are bonded to both halves of the ceramic block. The gap between each half of a ferrite piece corresponds to a given information track, the shield pieces being disposed, for example, between pairs of adjacent track-defining ferrite pieces. The whole face assembly is then shaped to optimize the gap cross-sections; and after which the face assembly is fitted with a rear assembly, including magnetic elements, and coils, for completing the magnetic circuits of the track-defining ferrite pieces.

While a head which is manufactured according to the prior art may be functionally acceptable, its structure is such as to leave something to be desired from a manufacturing standpoint: In the event a defect should occur anywhere within the ceramic material, the whole head could result in being a reject. Also, since the prior art teaches use of a "ceramic comb" that is fitted with track-defining ferrite pieces, fracturing of the relatively brittle comb teeth, either while slotting the ceramic block, or after such slotting, is a distinct possibility . Further, concerning the prior art use of a ceramic comb, track positioning, and track-to-track spacing, relative to the ceramic block is limited by relatively imprecise procedures for forming slots in the ceramic.

SUMMARY OF THE INVENTION

In what might be considered its most basic form, the invention proposes (1) that the ferrite supporting ceramic, which has been employed in the prior art, be replaced by any of that class of glasses which may be devitrified to form what are called "glass ceramics", and which, after devitrification, preferably have wear and thermal expansion characteristics which are compatible with, i.e. are similar to, the wear and thermal characteristics of the ferrite material used in the head; and (2) to avoid the prior art use of a ceramic comb, the invention proposes the stacking of precision-lapped ferrite pieces and ceramic (not glass ceramic) spacers, pre-fired ceramic-convertible glass however being employed at each stack level having a ceramic spacer. The stack is then fired, and compressed. As the stack cools, an integral track array assembly is formed comprising precision track defining ferrite pieces which are accurately spaced from each other within glass ceramic, and such "comb-less "assembly is formed without need for any separate bonding steps. The basic track array assembly may then be halved, coated with gapping material, bonded back together, and shaped as in the prior art. Also, slots for shield pieces, if desired, may then be cut into the assembly, the shield pieces which are set into such slots being of ferrite material having wear and thermal expansion charactersitics which are compatible with the rest of the assembly.

To obviate the above-described practice of slotting the integral glass ceramic and ferrite assembly to accommodate shield pieces, the invention further proposes, in another of its forms, that each level of ceramic-convertible glass be comprised of laminations, at least one of which is a ceramic-convertible glass of the type which is chemically machineable; and which has been chemically machined to present a shield-defining slot. Heating such a stack of ferrite and glass to the point at which such glass devitrifies results, without separate bonding steps, in a slotted track array assembly which may then be halved, coated with gapping material, bonded back together, fitted with shields, etc, as in the prior art.

OBJECT(S) OF THE INVENTION

To provide record and/or reproduce head structures which lend themselves to efficient manufacture thereof. The invention will be described with reference to the Figures, wherein:

FIG. 1 indicates a stacked assemblage of material according to one embodiment of the invention;

FIG. 2 indicates a basic track array assembly resulting from the assemblage of FIG. 1;

Figures 4, 6:
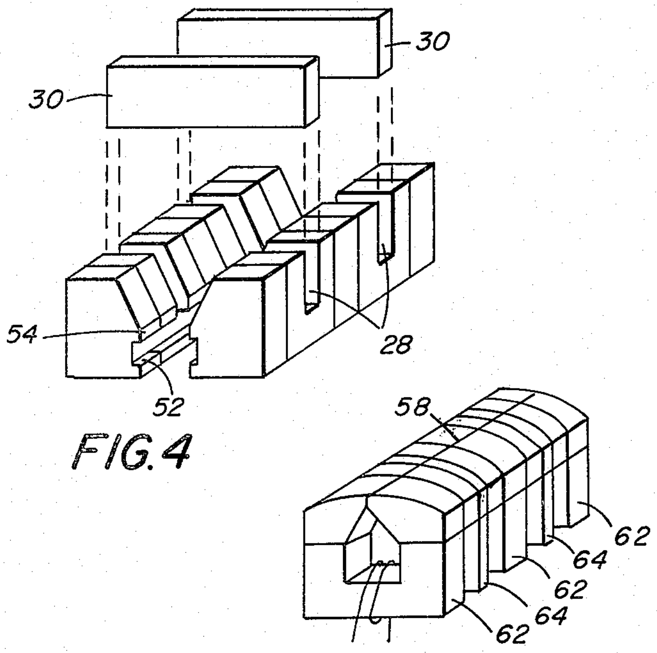
FIG. 6 depicts a face assembly, according to the invention, which has been fitted, at least in part, with back assembly components.
Figure 5:
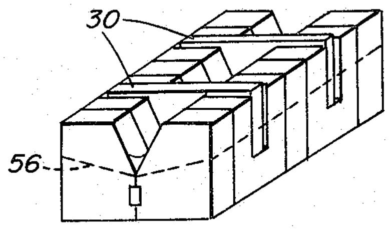
Figure 7:
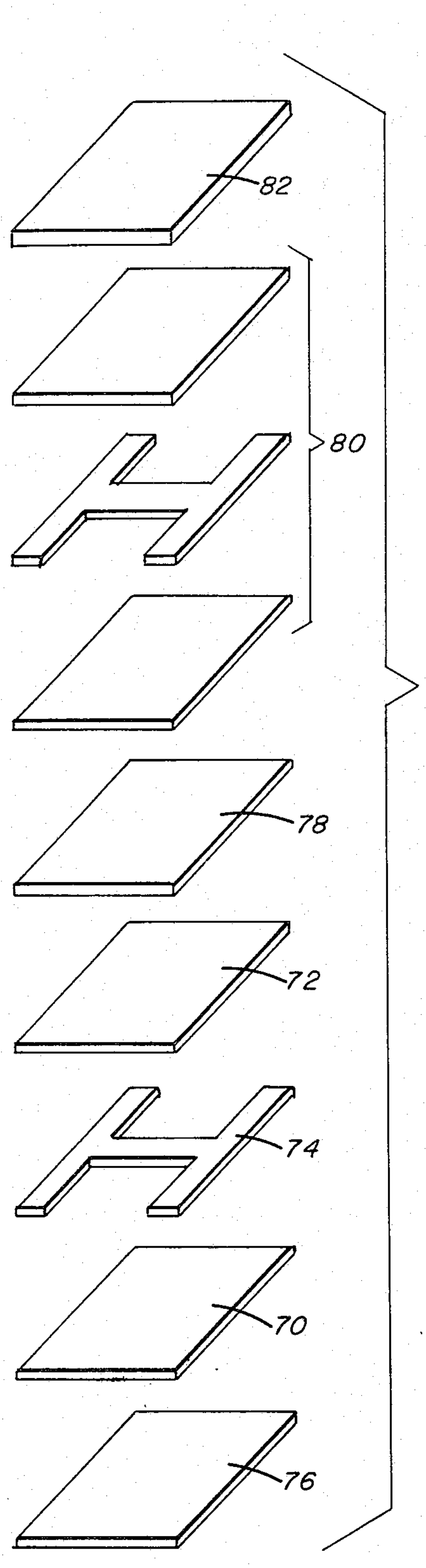
Figure 8:
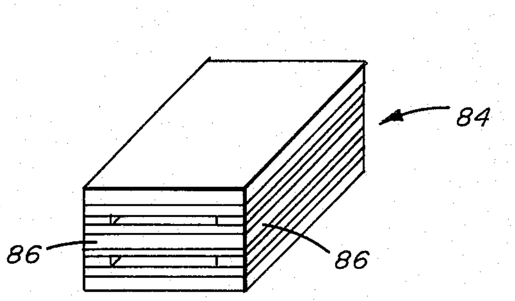
Figure 9:
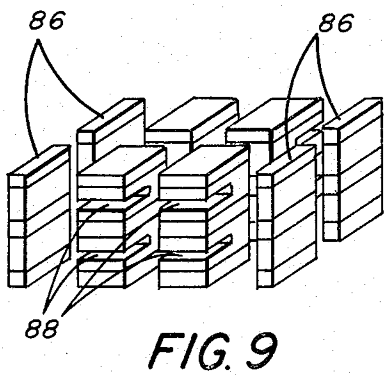

FIG. 7 indicates a stacked assemblage of material according to another embodiment of the invention;

FIG. 8 indicates a basic track array assembly resulting from the assemblage of FIG. 7; and FIG. 9 is a drawing which is useful in depicting various handling procedures for the basic track array assembly of FIG. 8, and which procedures precede the procedures suggested by FIGS. 4 through 6.

Figure 1:
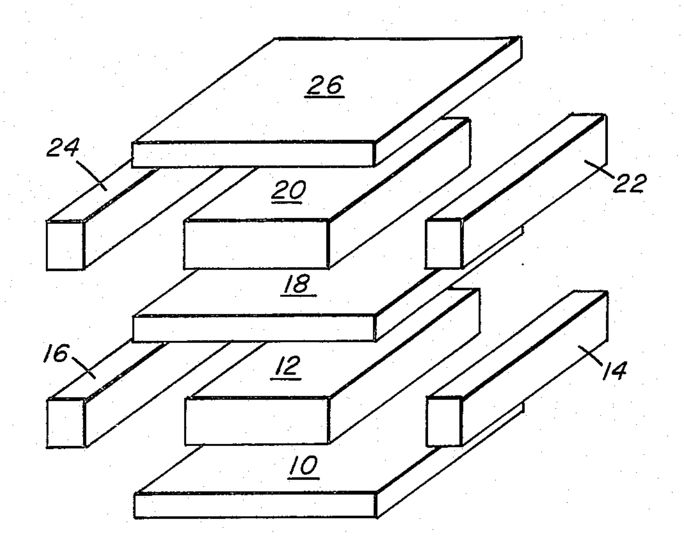

Referring now to FIGS. 1 through 6 and in particular to FIG. 1, a basic track array assembly according to the invention may be formed by placing on a first ferrite piece 10 a piece 12 of ceramic-convertible glass and, for example, a pair of ceramic, e.g. forsterite ($2MgO \cdot SiO_2$) spacers 14, 16 which straddle the glass piece 12. A second ferrite piece 18 is then placed atop the ferrite-ceramic-and-glass stack, and upon which a repeat, viz. parts 20, 22, 24 is made of what was placed on the first ferrite piece 10. Such stacking continues until one less than the desired number of tracks has been reached, and after which a ferrite piece 26, corresponding to the "missing "track caps the whole stack. As depicted in FIG. 1, a three-track array appears under construction.

The ferrite pieces 10, 18, 26 —and the ceramic spacers 14, 16, 22, 24 —are all lapped to dimensions having close tolerances; and the ceramic convertible glass pieces 12, 20 have slightly thicker dimensions than the spacers. Ceramic-convertible glass is a well-known commodity and indeed has been sufficiently well developed as to warrant at least one textbook ("Glass Ceramics",P. W. McMillan, Academic Press, Inc., 111 Fifth Avenue, New York, N. Y., Library of Congress Catalog Card No. 64-8067), devoted exclusively to such commodity. Generally, such glass will, in repsonse to some form of nucleating energy, devitrify into ceramic material. The invention places no constraints on the form of the ceramic-convertible glass which is employed other than that it "thermally devitrify"at a temperature below the melting points of the employed ferrite 10 and ceramic 14. Also, it is preferable that the thermal expansion and wear properties of the ferrite and glass-converted ceramic be compatible. One such ceramic-convertible glass useful in practicing the invention as depicted in either the embodiment of FIGS. 1 through 6, or in the embodiment of FIGS. 7 through 9, is the chemically machineable ceramic-convertible glass known as Fotoceram. Fotoceram has been well described in the literature, e.g. American Chemical Society, Industrial and Engineering Chemistry, Volume 45, page 115, January 1953; and, indeed, is available from Corning Glass Works, Corning, N. Y.

While pressure is applied to the ferrite pieces 10, 26 of FIG. 1, squeezing the stack, the stack is fired to a temperature at which the glass —but not the ferrite and ceramic —melts, and devitrifies into ceramic. Then the stack is cooled, resulting in a comb-less basic track array assembly (FIG. 2) having precise track and track-to-track dimensions; and all without need for the separate, and relatively tedious, step of bonding ferrite pieces to their supporting ceramic.

Figure 2:
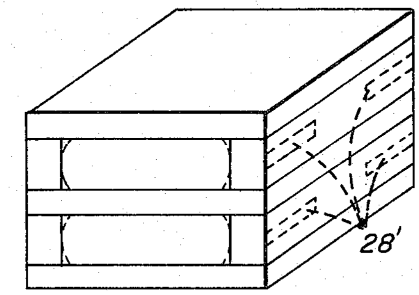
Figure 3:
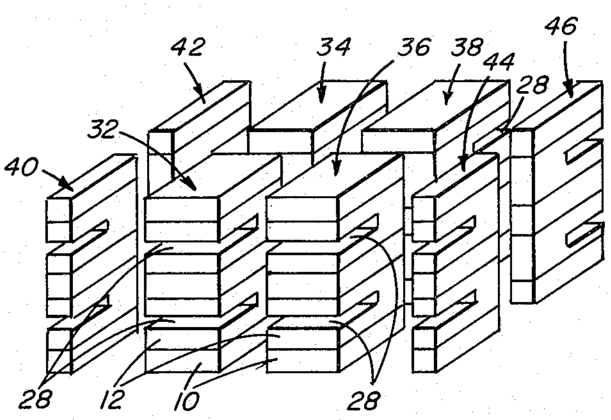
FIGS. 3 through 5 depict various procedures leading to a head face assembly embodying the invention.

If track-to-track shielding is desired, shield support slots 28 (see 28'in FIG. 2)are then cut into the basic track array assembly. The relative positions and dimensions of such slots 28, and of shield pieces 30 (FIG. 4), is not as critical as those concerning the track-defining ferrite pieces 10, 18, 26. The assembly of FIG. 2 is then diced into four half-section assembly sections 32, 34, 36, 38, the ceramic spacer supporting ends 40, 42, 44, 48 of the assembly being trimmed away and discarded. Needless to say, there is no special order in which the dicing, slotting, and trimming operations are performed; nor is there anything special about the fact that four half-section assembly sections are diced out, i.e. dicing, and the number of diced out sections, depend on the sizes of the head face assembly(ies) under construction and the size of the starter stack of ceramic, ferrite, and glass.

Reference should now be had to FIGS. 4 through 6 which show various prior art practices employed in the manufacture of heads: FIG. 4 shows a pair of diced half-sections which are chamfered (50) and grooved (52). As is the practice in the art, a gap-defining surface 54 is coated with gap spacer material, e.g. $Al_2O_3$, after which the face assembly half-sections are bonded into an integral assembly (FIG. 5) with shield pieces 30 in slots 28. The assembly of FIG. 5 is then contoured (dashed line 56) to dimension the depth of the head gap 58; and then the face assembly is fitted with a rear assembly which may take any of a variety of forms. Typically, FIG. 6 shows coil-supporting magnetic elements 62 for completing magnetic circuits corresponding to the ferrite parts of the face assembly, and all such elements may be embedded in potting material. The assembly of FIG. 6 may then be fitted with a terminal board and brackets.

Reference should now be had to FIGS. 7 through 9 which show procedures for eliminating the separate slotting of an integral track array assembly: As shown most particularly in FIG. 7, two pieces of ceramic-convertible glass 70, 72 sandwich a piece of Fotoceram 74 which has been chemically machined into an H-shape. The glass pieces 70, 72 may be of Fotoceram as well. Ferrite layers then sandwich the glass pieces 70, 72, 74; and then a second sandwich of glass 80 is laid upon the ferrite layer 78. Finally, the stack is capped with a ferrite piece 82, and fired. As a result of such firing, the glass pieces devitrify into ceramic and weld the whole stack into an assemblage 84 as shown in FIG. 8. By trimming away the ends 86 of the assemblage 84 —which may be done either before or after dicing —slots 88 in ceramic are exposed. Head finishing may then proceed as disclosed in relation to FIGS. 4 through 6.

The invention has been described in detail with particular reference to preferred embodiments thereof, but it will be understood that variations and modifications can be effected within the spirit and scope of the invention.

We claim:

1. A face assembly for a magnetic record and/or reproduce head having:

a. first and second members, each comprising first and second ferrite laminations, glass ceramic between said ferrite laminations and bonding said ferrite laminations, together with said glass ceramic, into an integral assembly said assembly having at least one face exposing parts of both said ferrite laminations;

b. means bonding said first and second members together so that the ferrite laminations of said first member align with the ferrite laminations of said second member; and c. means disposed between the aligned ferrite laminations for prividing non-magnetic gaps between the aligned ferrite laminations, said glass ceramic being comprised of Fotoceram.

2. A magnetic record and/or reproduce head, comprising a face assembly and a rear assembly for completing magnetic circuits defined by said face assembly, said face assembly comprising:

a. first and second members, each comprising first and second ferrite laminations, glass ceramic between said ferrite laminations, and bonding said ferrite laminations, together with said glass ceramic, into an integral assembly, said assembly having at least one face exposing parts of both said ferrite laminations;

b. means bonding said first and second members together so that the ferrite laminations of said first member align with the ferrite laminations of said second member; and c. means disposed between the aligned ferrite laminations for providing non-magnetic gaps between the aligned ferrite laminations, said glass ceramic being comprised of Fotoceram.

* * * * *